(Model.)
S. H. EVERETT.
Fertilizer Distributer.
No. 237,843.　　　　　　　　Patented Feb. 15, 1881.
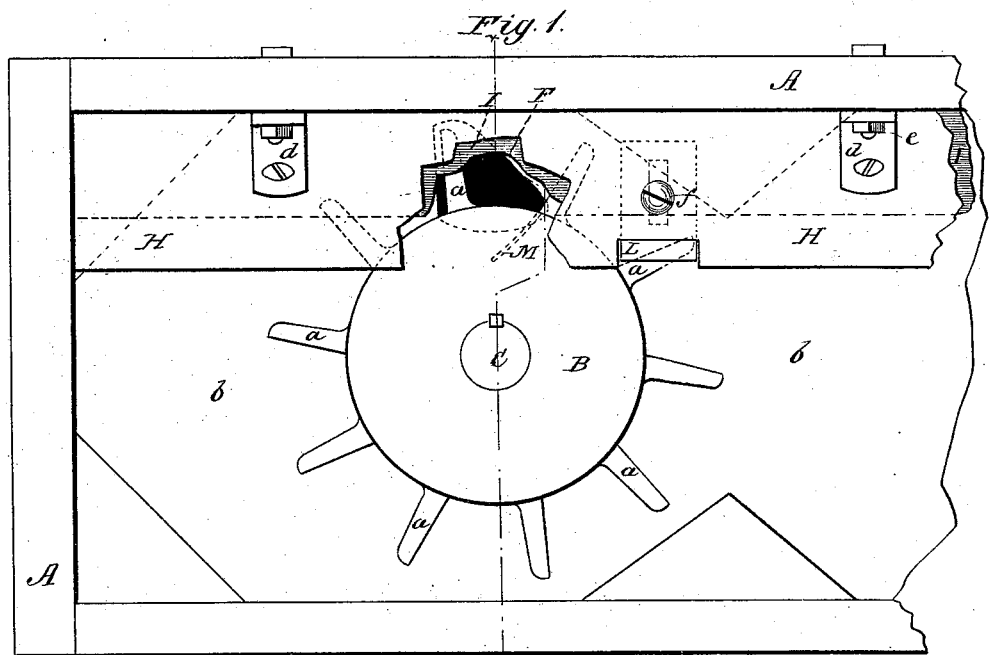
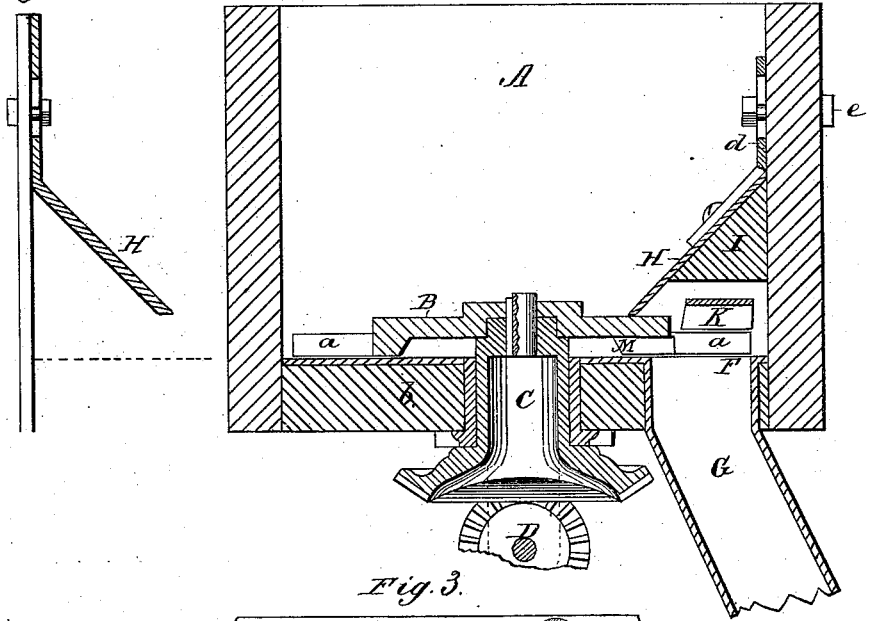
WITNESSES:
W. W. Hollingsworth
Amos N. Hart
INVENTOR:
S. H. Everett
BY
ATTORNEYS.

UNITED STATES PATENT OFFICE.

SAMUEL H. EVERETT, OF MACEDON, NEW YORK.

FERTILIZER-DISTRIBUTER.

SPECIFICATION forming part of Letters Patent No. 237,843, dated February 15, 1881.

Application filed October 18, 1880. (Model.)

*To all whom it may concern:*

Be it known that I, SAMUEL H. EVERETT, of Macedon, in the county of Wayne and State of New York, have invented a new and useful Improvement in Fertilizer-Distributers; and I do hereby declare that the following is a full, clear, and exact description of the same, reference being had to the accompanying drawings, forming part of this specification, in which—

Figure 1 is a plan view of one end of a box or hopper, a portion being broken out, showing the parts constituting my improvements arranged as required for use. Fig. 2 is a vertical section on line $x\,x$, Fig. 1. Fig. 3 is a plan view of a portion of the cut-off and its attachments inverted. Fig. 4 is a sectional view, showing the cut-off attached to standards instead of the side of the hopper.

My invention is an improvement in the class of fertilizer-distributers in which a wheel provided with arms is arranged to rotate horizontally at the bottom of a hopper and thereby deliver the fertilizer through an opening in the latter.

The invention is more particularly an improvement upon the machine for which I have received Letters Patent No. 222,478, dated December 9, 1879. In the present case I have changed and improved the mechanism for discharging the fertilizer, so that it operates more perfectly.

The features of novelty will be hereinafter described after making due reference to what is shown in my previous patent.

In said drawings the letter A indicates the box or hopper for receiving the fertilizer, and B the wheel for discharging it. The wheel is provided with horizontal arms $a$ and mounted on a vertical hollow axis, C, which is suitably geared with the axle D of the machine. As the wheel revolves its arms $a$ sweep over the flat bottom $b$ of the hopper and deliver the fertilizer, through an opening, F, into a spout, G, which conducts it into the furrow opened by a drill-tooth. Such opening is longer than the wheel-arms $a$ and extends beneath the circular body of the wheel B, and its edge, over which the fertilizer passes into the spout G, is inclined diagonally to the diameter of the box A, so that the shoulder or inner end of any one arm $a$ will pass the inner end of such diagonal edge first, and thus make what may be termed a "shear cut" across it. The effect is to cause the fertilizer to discharge gradually and in a constant stream instead of intermittently and in masses. There will be as many of such discharge-wheels and delivery-openings in the box A as its length will accommodate.

The above-described parts are constructed and arranged to co-operate in substantially the same manner as in my aforesaid previous patent.

It is necessary to cut off the fertilizer in order to regulate the quantity discharged in a given time. In this instance I employ a plate, H, which is placed at an angle, preferably about forty-five degrees, to the bottom of the hopper A, and secured in such manner as to allow convenient vertical adjustment. The inclined position of the cut-off effects an important result—namely, it prevents the lodgment of fertilizer on its upper side, and thus enables me to dispense with a scraper for the purpose of removing it, as in my former invention.

In Figs. 1 2 3 of the drawings the plate is shown attached to a wooden bar I, which serves as a stiffener for the same, and is attached to the side of the hopper A, which may, in practice, be the back of a grain-hopper; but in Fig. 4 the bar is dispensed with, and the plate attached to vertical standards, so that it forms one side of the hopper. It is, hence, apparent that the discharge-opening is practically outside the hopper, and that the fertilizer cannot be discharged from the latter except by the positive action of the wheel.

The cut-off H is preferably constructed from galvanized iron, and the means shown for securing it in position and adjusting it vertically are the slotted ears $d$, and screw-bolts $e$ that pass through the latter. Its lower edge is close to the upper side of the body of the wheel B, leaving a considerable space between it and the arms $a$. The fertilizer crowds through such space as the wheel revolves, and the upper portion of it runs against the device K, which produces a force-feed, or, in other words, insures its passage in uniform quantity through the opening F. The device K is arranged beneath the cut-off H, and it may be a block, arm, or flange, and attached to any fixed portion of the machine; but I prefer to construct it of an elastic plate having its free end bent transversely, Fig. 3, in a direction parallel to the diagonal edge of the opening. Such device, or, rather, the bent end of such plate, is located over the opening F, and serves to arrest the fertilizer that lies above and upon the wheel-arms a, and to force it downward into and through the opening F. Being attached to the bar I it is necessarily adjusted vertically with it, and hence requires no independent adjustment, so that its local relation to or distance above the wheel-arms a will always be relatively the same as that of the cut-off H. One part of the cut-off immediately over the wheel-arms a is cut out and a slide, L, applied to fill the space. Such slide L is secured by a screw, f, in any adjustment required, so that the quantity of fertilizer allowed to pass to the discharge-opening may be regulated without adjusting the entire cut-off plate H.

An independent slide may be provided for each wheel B, or the slides for all the wheels may be connected to or form part of a bar or plate extending lengthwise of the cut-off H.

The fertilizer tends to work beneath the body of the wheel, although the latter runs as close as practicable to the bottom of the hopper, and its adhesive character, before referred to, causes it to accumulate on the antagonized surfaces, so as to obstruct or impede the operation of the machine. In order to prevent such result I provide a scraper, M, which is a narrow rib cast on or attached to the under side of the body of the wheel B, and arranged parallel, or nearly so, to any one of its arms. The opening F also extends inward beneath the edge of the body of the wheel, and thus, as the wheel revolves, the scraper M removes the fertilizer that has worked beneath the wheel, and forces it outward over the edge of the opening, where it joins the main stream.

I do not claim, broadly, to have been the first to arrange cut-off plates at an inclination, nor to have made them adjustable to vary the amount of fertilizer, &c., discharged.

What I claim as my invention is—

1. In a fertilizer-distributer, the combination, with the box or hopper and a series of horizontal discharge-wheels arranged in line on the bottom of the same, of the cut-off plate H, which is inclined at an angle of about forty-five degrees, and extends over the several wheels, and is attached to the side of the hopper, all as shown and described.

2. In a fertilizer-distributer, the combination, with the box or hopper and a horizontal rotating wheel having peripheral arms a, of the downwardly-inclined cut-off H, arranged to project over a portion of the wheel, and made bodily adjustable in a vertical plane, and the device K, for forcing the fertilizer into the discharge-opening, substantially as shown and described.

3. In a fertilizer-distributer, the combination, with hopper A and horizontal rotating wheel B, having peripheral arms a, and a discharge-opening, F, extending inward beneath the body of said wheel, of a scraper, M, arranged beneath and attached to the wheel so as to pass over the opening, and operate as shown and described.

The above specification of my invention signed by me this 7th day of October, 1880.

SAMUEL H. EVERETT.

Witnesses:
AMOS W. HART,
CHAS. A. PETTIT.